United States Patent
Hosein

(10) Patent No.: US 8,331,248 B2
(45) Date of Patent: Dec. 11, 2012

(54) SYSTEM AND METHOD FOR DYNAMIC RESOURCE ALLOCATION IN WIRELESS COMMUNICATIONS NETWORKS

(75) Inventor: Patrick Hosein, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 802 days.

(21) Appl. No.: 12/129,453

(22) Filed: May 29, 2008

(65) Prior Publication Data

US 2008/0304448 A1    Dec. 11, 2008

Related U.S. Application Data

(60) Provisional application No. 60/942,324, filed on Jun. 6, 2007.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04J 3/00 | (2006.01) |
| H04J 3/02 | (2006.01) |
| H04L 1/00 | (2006.01) |
| H04L 12/26 | (2006.01) |
| H04L 12/413 | (2006.01) |
| H04W 72/00 | (2009.01) |
| H04B 7/00 | (2006.01) |

(52) U.S. Cl. ........................................................ 370/252

(58) Field of Classification Search ................. 370/252, 370/336, 345, 445, 462; 455/450, 509
See application file for complete search history.

(56) References Cited

U.S. PATENT DOCUMENTS

| | | | |
|---|---|---|---|
| 7,492,743 B2 * | 2/2009 | Uhlik | 370/337 |
| 2002/0075891 A1 * | 6/2002 | Souissi | 370/442 |
| 2007/0121545 A1 | 5/2007 | Park et al. | |
| 2007/0218889 A1 * | 9/2007 | Zhang et al. | 455/422.1 |
| 2007/0230600 A1 * | 10/2007 | Bertrand et al. | 375/260 |
| 2008/0298315 A1 * | 12/2008 | Ihm et al. | 370/329 |

FOREIGN PATENT DOCUMENTS

| | | |
|---|---|---|
| WO | WO 99/57925 | 11/1999 |
| WO | WO 02/067469 A1 | 8/2002 |

OTHER PUBLICATIONS

Vinel et al., "Performance Analysis of the Random Access in IEEE 802.16", 2005 IEEE 16th International Symposium on Personal, Indoor and Mobile Radio Communications.*

(Continued)

Primary Examiner — Alpus H Hsu
Assistant Examiner — Yee Lam
(74) Attorney, Agent, or Firm — Slater & Matsil, L.L.P.

(57) ABSTRACT

System and method for dynamic resource allocation in wireless communications networks. A method for dynamically allocating resources of a contention channel comprises computing an expected delay for a transmission made by a user over the contention channel, determining a target probability of collision from the expected delay, computing an allocation of resources of the contention channel using the target probability of collision, and allocating resources of the contention channel using the computed allocation of resources.

6 Claims, 12 Drawing Sheets

OTHER PUBLICATIONS

Hosein, P., "Dynamic Resource Allocation for Uplink Contention Channels in WiMAX," 2008, 6 pp., IEEE, Los Alamitos, CA.

Kwak, B.-J., et al., "Analysis of the Stability and Performance of Exponential Backoff," Wireless Communications and Networking (WCNC 2003), Mar. 2003, pp. 1754-1759, vol. 3, IEEE, New Orleans, LA.

Ni, Q., et al., "Wireless Broadband Access: WiMAX and Beyond—Investigation of Bandwidth Request Mechanisms under Point-to-Multipoint Mode of WiMAX Networks," IEEE Communications Magazine, May 2007, pp. 132-138, vol. 45, Issue 5, IEEE, Toronto, Ontario, Canada.

Vinel, A., et al., "WLC22-4: Efficient Request Mechanism Usage in IEEE 802.16," IEEE Global Telecommunications Conference (Globecom '06), Nov. 2006, pp. 1-5, IEEE, San Francisco, CA.

"Written Opinion of the International Searching Authority," International Application No. PCT/CN2008/071212, Applicant: Huawei Technologies Co., Ltd. et al., Sep. 4, 2008, 5 pages.

* cited by examiner

SYSTEM AND METHOD FOR DYNAMIC RESOURCE ALLOCATION IN WIRELESS COMMUNICATIONS NETWORKS

This application claims the benefit of U.S. Provisional Application No. 60/942,324, filed on Jun. 6, 2007, entitled "Dynamic Resource Allocation for Uplink Contention Channels in IEEE 802.16," which application is hereby incorporated herein by reference.

TECHNICAL FIELD

The present invention relates generally to a system and method for wireless communications, and more particularly to a system and method for dynamic resource allocation in wireless communications networks.

BACKGROUND

In wireless communications networks, such as those compliant to the IEEE 802.16 technical standard, a base station (BS) may communicate with one or more subscriber stations (SS) over a downlink (DL), while the SS may communicate with the BS over an uplink (UL). An SS makes use of a contention channel in the UL connecting the SS with the BS to transmit requests to the BS for ranging and/or bandwidth allocation purposes. Ranging requests may be used by the SS to obtain access to the BS and may include several different types of requests, including a) an initial ranging that may be used for network entry, b) periodic ranging that may be used for network synchronization, and c) hand-off ranging that may be used to acquire a new member into a diversity set of the SS. Bandwidth allocation requests may be used to request bandwidth specifically dedicated to the SS to allow the SS to transmit data. If the BS grants the SS's request, the SS may be allocated a contention free transmission period to perform its requested operation.

In an IEEE 802.16 compliant wireless communications network, orthogonal frequency division multiple access (OFDMA) may be used to make efficient use of available transmission bandwidth as well as allowing multiple transmissions to occur simultaneously. Transmissions using OFDMA may take place over two different dimensions, a time-frequency dimension and a code dimension. The SS, desiring to transmit a request to the BS, may randomly select a time-frequency resource that has been allocated as being a part of a contention channel and a code out of a set of possible codes to encode its transmission. The transmission of the SS, after being modulated to the selected frequency and encoded by the selected code, may be transmitted to the BS at the selected time.

FIG. 1a illustrates a structure of a frame 100 of an IEEE 802.16 compliant wireless communications network operating in a time division duplex (TDD) mode. The frame 100 includes a downlink (DL) subframe 105 that may be used for transmissions originating at the BS and an uplink (UL) subframe 110 that may be used for transmissions originating at the SS. Since the wireless communications network is operating in TDD mode, transmissions made in the DL subframe 105 and the UL subframe 110 utilize the same frequency range and are separated in time.

The DL subframe 105 includes a preamble 115 that may be used for PHY layer synchronization, a frame control header (FCH) 117 that may be used for specifying a profile and length of one or more DL bursts, such as DL burst #1 119, immediately following the FCH 117. The UL subframe 110 includes a contention slot for use in initial ranging 120, a contention slot for bandwidth requests 122, and one or more UL protocol data units (PDU) from the SS, such as a UL PDU from SS #1 124. A UL PDU includes a preamble 126 and a UL transmission burst 128.

FIG. 1b illustrates a structure of a frame 150 of an IEEE 802.16 compliant wireless communications network operating in a frequency division duplex (FDD) mode. The frame 150 includes a DL subframe 155 and a UL subframe 160. Since the wireless communications network is operating in FDD mode, transmissions made in the DL subframe 155 and the UL subframe 160 may utilize different frequency ranges and may occur during the same time.

The DL subframe 155 includes a preamble 165 that may be used for PHY layer synchronization, an FCH 167 that may be used for specifying a profile and length of one or more DL bursts, such as DL burst #1 169, immediately following the FCH 167. The UL subframe 160 includes a contention slot for use in initial ranging 170, a contention slot for bandwidth requests 172, and one or more UL protocol data units (PDU) from the SS, such as a UL PDU from SS #1 174. A UL PDU includes a preamble 176 and a UL transmission burst 178.

In an IEEE 802.16 compliant wireless communications network, the amount of uplink resources allocated to the contention channel may be chosen by the BS and then signaled to the SS in the wireless communications network in a UL channel descriptor (UCD) message. The BS may change the uplink resource allocation as it sees fit, needing only to inform the SS in the wireless communications network of any changes in the uplink resource allocation.

The amount of uplink resources dedicated to the contention channel (for example, a number of channels or sub-channels of the uplink dedicated solely for the contention channel) for the purpose of ranging and/or bandwidth requests may have an impact on the overall performance of the wireless communications network. For example, if a small amount of resources is allocated to the contention channel, then more resources may be freed for the actual transmission of data, which may increase the data throughput. However, with relatively few contention resources, transmission collisions of the ranging and/or bandwidth requests may occur with relatively high frequency. This may lead to the SS experiencing long delays in waiting for their ranging and/or bandwidth requests to be granted, thereby reducing the overall performance of the wireless communications network. Alternatively, if a large amount of resources are allocated to the contention channel, then the SS may experience short delays in their ranging and/or bandwidth requests. However, since few resources are available for the actual transmission of data, the overall data throughput of the wireless communications network may be low, resulting in a slow wireless communications network.

One commonly used technique for determining the amount of uplink resources to be dedicated to the contention channel may be through the analysis of actual network traffic and/or simulation studies. For example, collected network traffic and/or simulation studies for a variety of application types and loads may be used to determine the amount of uplink resources to be dedicated to the contention channel. The results of the analysis (such as a table of uplink resources to be allocated for the contention channel indexed by traffic type and load) may be stored in the BS and then depending on expected traffic type and load, the BS may select the amount of uplink resources to be allocated for the contention channel and then broadcast the uplink resource allocation to the SS using a UCD message.

SUMMARY OF THE INVENTION

These and other problems are generally solved or circumvented, and technical advantages are generally achieved, by embodiments of a system and a method for dynamic resource allocation in wireless communications networks.

In accordance with an embodiment, a method for dynamically allocating resources of a contention channel is provided. The method includes determining an expected delay for a transmission made by a user over the contention channel, determining a target probability of collision from the expected delay, and computing an allocation of resources of the contention channel using the target probability of collision. The method also includes allocating resources of the contention channel using the computed allocation of resources.

In accordance with another embodiment, a method for operating a wireless communications network is provided. The method includes coordinating communications in the wireless communications network, determining a new value of an observable metric, and reallocating resources of a contention channel in response to a determining that the new value of the observable metric differs from an old value of the observable metric by more than a threshold.

In accordance with another embodiment, a communications device for use in a wireless communications network is provided. The communications device includes a transmitter coupled to an antenna, a receiver coupled to the antenna, a signal processor coupled to the transmitter and to the receiver, and a processor coupled to the signal processor. The transmitter transmits data over-the-air using the antenna, and the receiver uses the antenna to receive a transmission transmitted over-the-air. The signal processor performs signal processing on data to prepare the data for transmission and converts the received transmission back into data, and the processor determines values of an observable metric related to network performance of the wireless communications network and dynamically allocates resources of a contention channel using the values of the observable metric.

An advantage of an embodiment is the dynamic nature of the embodiment, meaning that the allocation of the uplink resources to the contention channel may change with changes in the amount and/or type of network traffic. This may allow for a fine tuning of the performance of a wireless communications network to meet actual network traffic requirements.

A further advantage of an embodiment is that the embodiment does not require the addition of a significant amount of additional hardware. This may allow for rapid and inexpensive deployment of the embodiment.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications network compliant to the IEEE 802.16 technical standards. The invention may also be applied, however, to other wireless communications network that make use of a contention channel for ranging, bandwidth, and other requests from SS, mobile stations, other communications devices, and so forth.

Figure 1A:
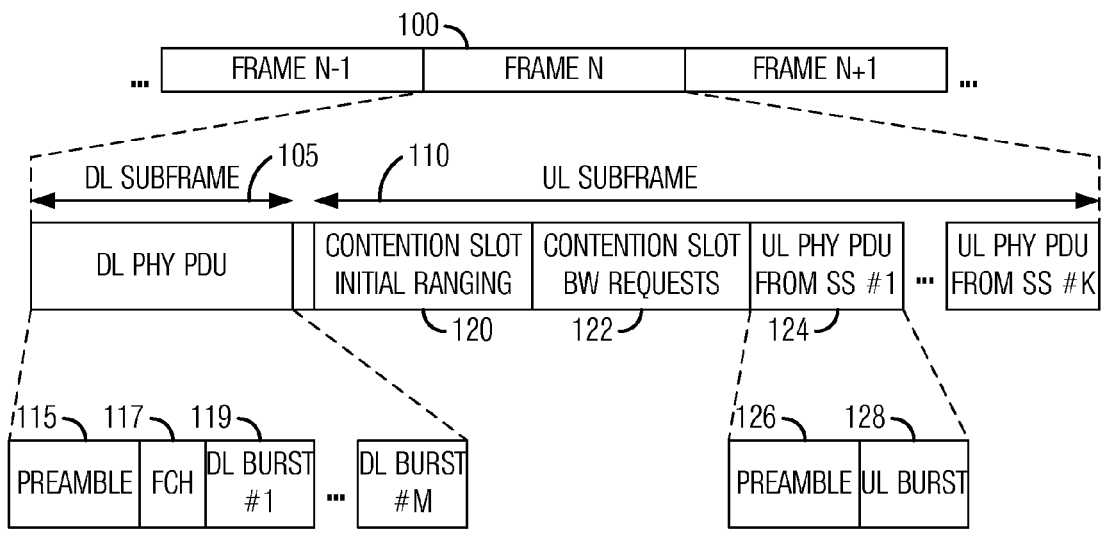
FIG. 1a is a diagram of a frame structure of a time division duplex wireless communications network.
Figure 1B:
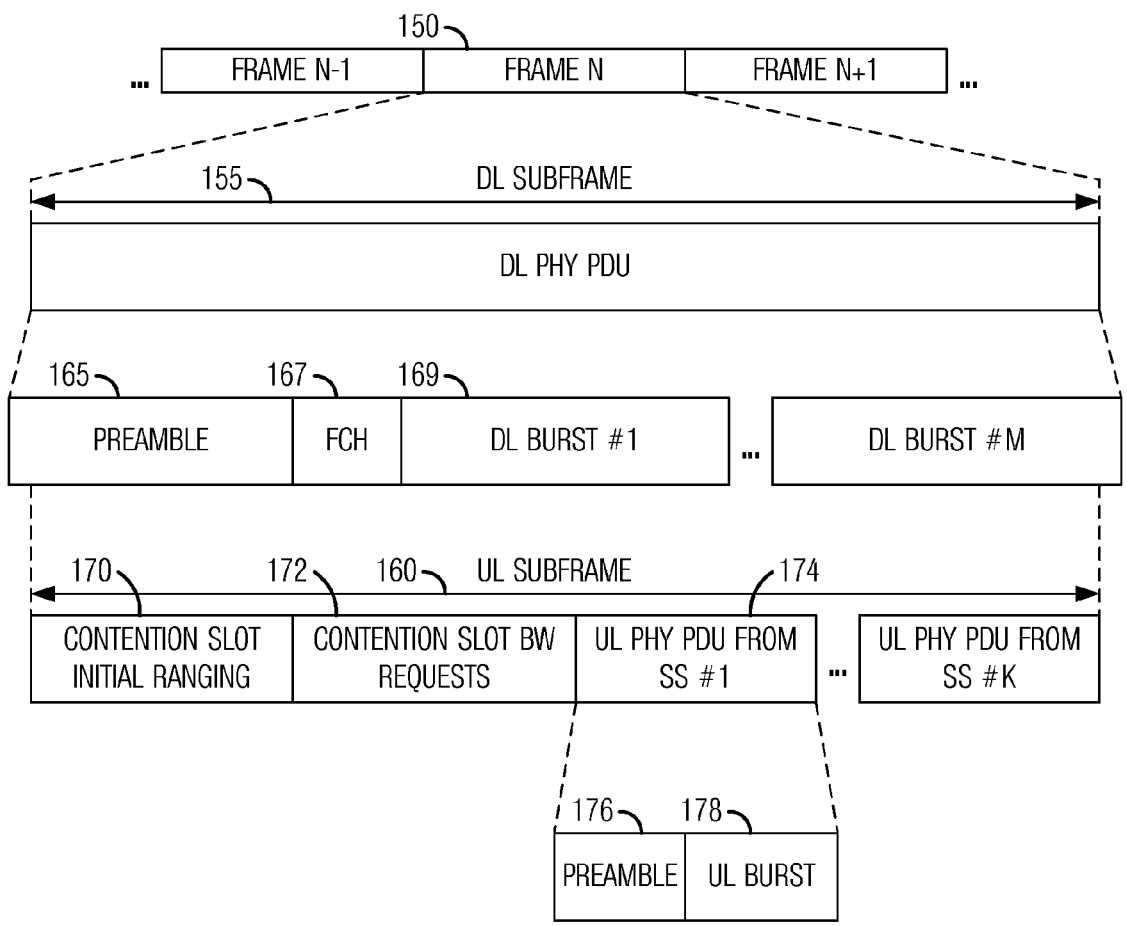
FIG. 1b is a diagram of a frame structure of a frequency division duplex wireless communications network.
Figure 2:
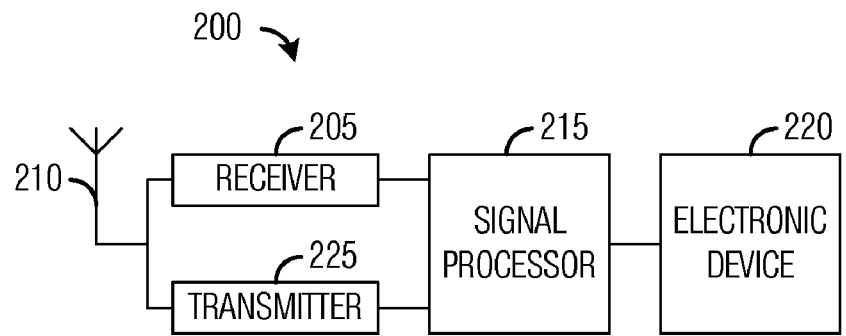
FIG. 2 is a diagram of a subscriber station.

FIG. 2 illustrates a high-level view of an SS 200. The SS 200 includes a receiver 205 that may be used to receive transmissions received by an antenna 210. Although shown as a single antenna, the SS 200 may utilize multiple antennas. The received transmissions may be provided to a signal processor 215 that may be used to decode, error detect, error correct, and so forth, the received transmissions. In general, the signal processor 215 may be used to perform data processing operations on the received transmissions in order to convert the received transmissions into a form that may be suitable for use by an electronic device 220 coupled to the SS 200. A wide variety of electronic devices may be coupled to the SS 200, using the SS 200 to provide connectivity to other electronic devices, data sources and sinks, external and internal networks, and so forth. Examples of electronic devices that may be coupled to the SS 200 may include computers, personal digital assistants, communications devices, multimedia players and servers, monitoring equipment, display equipment, and so on. The SS 200 also includes a transmitter 225 coupled to the baseband processor 215 and the antenna 210. The transmitter 225 may be used to allow the electronic equipment coupled to the SS 200 to transmit information/data to other electronic equipment.

The signal processor 215 may also be used to coordinate communications with a BS and other SS operating in a wireless communications network. The signal processor 215 may need to follow a set of rules and conventions specified by a technical standard or specification, such as the IEEE 802.16 technical standard. Compliance to a technical standard or specification may help to ensure interoperability between the SS 200 and the BS and other SS in the wireless communications network.

For example, when attempting to request permission for ranging operations and/or a bandwidth allocation, the SS 200 in an IEEE 802.16 compliant wireless communications network may randomly select a transmission slot (a transmission frequency and a transmission time) within a contention slot dedicated to the request type and then a code from a set of possible codes to encode data in the transmission. The SS 200 may then randomly choose a frame time slot from within a minimum back-off window size and makes the transmission at the frame time slot. A BS controlling the wireless communications network attempts to decode the transmitted request and if it successfully decodes the request, responds with a transmission in the selected transmission slot encoded with the selected code. If the request is successful, the SS 200 may receive a contention free transmission slot(s) to perform its requested operation. If the SS 200 does not receive a response from the BS, the SS 200 may continue transmitting requests with higher power levels and at randomly selected transmission slots until the BS responds or until the SS 200 exceeds a maximum number of retries.

The BS may control assignments on the uplink contention channel through the use of UL-MAP messages and may determine which transmission slots are subject to collisions. A collision may occur during the contention period when multiple SS may randomly transmit requests. When the SS 200 has information to send and wishes to enter a contention resolution process, it may set an internal back-off window equal to a back-off start associated with the request type (for example, a bandwidth request or an initial ranging request). The SS 200 may then randomly select a number with a value within its internal back-off window. This randomly selected number may indicate a number of contention transmission opportunities that the SS 200 may be required to defer before it transmits.

The SS 200 may consider only contention transmission opportunities for which its transmission may have been eligible. The SS 200 may consider the contention transmission opportunity lost if no reply (for example, in the form of a data grant message from the BS) is received within a specified time-out value. When this occurs, the SS 200 may increase its internal back-off window by a factor of two (up to a maximum back-off window size). The SS 200 may repeat the contention resolution process with a new randomly selected value from its internal back-off window until it receives a reply or until it exceeds a maximum number of retries.

Figure 3:
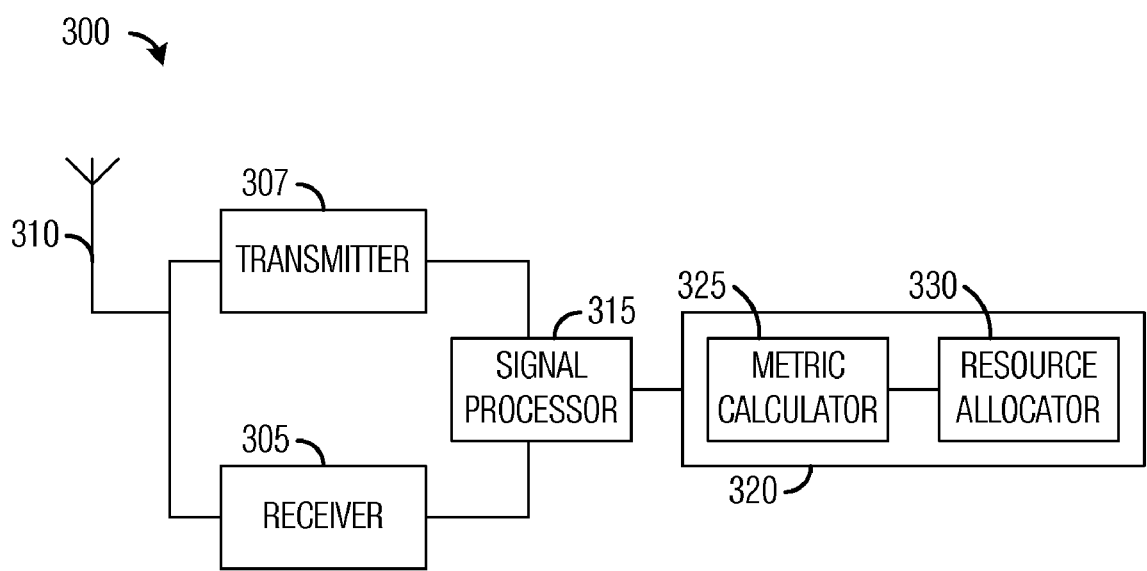
FIG. 3 is a diagram of a base station.

FIG. 3 illustrates a high level view of a BS 300. Like the SS 200, the BS 300 includes a receiver 305 to receive transmissions from SS operating in a wireless communications network controlled by the BS 300 and a transmitter 307 to transmit to SS operating in the wireless communications network. The receiver 305 and the transmitter 307 may be coupled to an antenna 310. Although shown as a single antenna, the BS 300 may use multiple antennas to exploit diversity and multiple independent data streams to improve performance. The BS 300 also includes a signal processor 315. The signal processor 315 may be used to perform signal processing operations on the received transmissions. The signal processor 315 may perform signal processing operations such as decode, error detect, error correct, and so forth, operations on the received transmissions.

The BS 300 also includes a processor 320. The processor 320 may be used to coordinate communications between the BS 300 and SS operating in the wireless communications network. For example, the processor 320 may respond to ranging requests, bandwidth requests, and so forth, from the SS operating in the wireless communications network. The processor 320 may respond to the requests and schedule grants to the requests so that transmission collisions are prevented.

Additionally, the processor 320 may be used to maintain and analyze performance information regarding the wireless communications network, and if necessary, the processor 320 may make adjustments to the configuration of the wireless communications network to help maintain or improve the performance of the wireless communications network. For example, if in analyzing the performance information, the processor 320 notes that one or more metrics of network performance may be changing. The processor 320 may then reconfigure the wireless communications network, such as, change the allocation of network resources to either stabilize or improve the network performance.

The processor 320 includes a metric calculator 325. The metric calculator 325 may be used to compute metrics that provide an indication of the performance of the wireless communications network. For example, the metric calculator 325 may be used to compute metrics such as probability of collisions, probability of success, probability of empty transmission slots, bit-error rate, frame-error rate, block-error rate, and so forth. The processor 320 also includes a resource allocator 330. The resource allocator 330 may be coupled to the metric calculator 325. The resource allocator 330 may be used to assign allocateable resources in order to change the performance of the wireless communications network. For example, the resource allocator 330 may increase the number of allocateable resources to the contention channel in the UL to help reduce the probability of collisions. A detailed description of the operation of the metric calculator 325 and the resource allocator 330 is provided below. Although shown in FIG. 3 as being separate units, the signal processor 315 and the processor 320 may be combined in a single unit.

Figure 4:
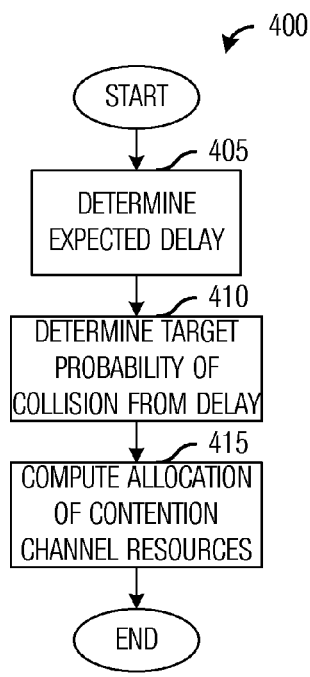
FIG. 4 is a diagram of a sequence of events in the dynamic allocation of contention channel resources.

FIG. 4 illustrates a sequence of events 400 in the dynamic allocation of contention channel resources. The sequence of events 400 may be descriptive of events occurring in the dynamic allocation of uplink resources for a contention channel in an IEEE 802.16 compliant wireless communications network. The sequence of events 400 may be used in the dynamic, closed loop allocation of contention channel resources. The discussion may focus on a contention channel associated with bandwidth requests, however, the sequence of events 400 may readily be extended by those of ordinary skill in the art of the embodiments to a contention channel associated with ranging requests and so forth. Therefore, the discussion of the contention channel for bandwidth requests should not be construed as being limiting to either the scope or the spirit of the embodiments.

The events described in the sequence of events 400 may occur mainly in the processor 320 of the BS 300. More specifically, the events may mostly occur in the metric calculator 325 and the resource allocator 330. However, it may be possible to implement the events entirely in software or a combination of software and hardware, with the software executing on a processor, such as the processor 320.

The dynamic allocation of the contention channel resources may involve a determining of an expected delay for any user i or an SS in the wireless communications network (block 405). The delays encountered by an SS (or user) as it attempts to perform a ranging request and/or a bandwidth allocation request may provide insight into the performance of the wireless communications network. However, since the delays are encountered by the SS (or the user) and generally, the analysis of the performance of the wireless communications network is performed at the BS 300, the delays encountered by the SS may not be readily available to the BS 300. Therefore, network metrics that may generally be available at the BS 300, such as a probability of collision, probability of an empty or successful transmission slot, and so forth, may be useful in providing information related to the performance of the wireless communications network.

A model of a wireless communications network may be created and used to determine a relationship between a controllable metric (such as a number of uplink resources allocated to the contention channel) and an observable metrics (such as probability of collision). The model of the wireless communications network may make use of the following assumptions: transmission attempts within a particular transmission slot may be independent of previous transmission attempts; there may be no upper limit on the maximum backoff window size; transmission requests may not be dropped; and transmission failure rates are not considered.

Assuming that S uplink slots may be allocated to bandwidth requests (a similar model may be utilized for ranging requests) and that C codes are available for such requests, where S and C are integer values, then m=SC channels may be available to each SS in the wireless communications network. If the bandwidth request rate of a user i is denoted $\mu_i$, then an expected load on a single channel may be expressed as $\mu_i/m$. Although $\mu_i/m$ may be a stochastic quantity, a mean value may be used in the contention channel model. Let N be a number of users making bandwidth requests.

Furthermore, let $p_b$ denote a probability that an attempt to use a given channel is unsuccessful. This probability may be commonly referred to as a block probability. Additionally, let the blocking probability be equal to the probability of collision of the channel. In practice, the blocking probability may need to be adjusted upwards to account for the fact that even without a collision an attempt may be unsuccessful because of transmission errors. It may also need to be adjusted downwards to account for the fact that even though there is a collision a collided packet may still be decodable if sufficient energy is received. The adaptive nature of the embodiments may automatically take these factors into account. Generally, the probability of collision may be determined from the total energy received within a transmission slot: if the total energy exceeds a threshold but no transmission is decoded, then a collision may be declared.

Let $p_e$ be a probability of an empty slot and $p_s$ be a probability of success. For a stable wireless communications network, the arrival rate of the wireless communications network should be equal to the throughput of the wireless communications network. Also, the normalized throughput may simply be the probability of success. Since the arrival rate may be normalized by the frame rate, then the probability of success may be expressed as:

$$p_s = \sum_{i=1}^{N} \frac{\mu_i}{m}. \tag{1}$$

Let $\lambda_i$ be the normalized attempt rate for user i. This may be equivalent to the probability of user i making a transmission attempt in a given transmission slot. The probability that the user is successful may be the probability that the user makes a transmission attempt multiplied with the probability that no other user makes a transmission attempt. The success probability may also be equal to the normalized arrival rate for a stable wireless communications network. Therefore, it may be possible to equal the normalized arrival rate with the success probability. This may be expressed as:

$$\frac{\mu_i}{m} = \lambda_i \prod_{i \neq j} (1 - \lambda_j). \tag{2}$$

The probability that a transmission slot is empty may be equal to the probability that no access attempts are made and may be expressed as:

$$p_e = \prod_{i=1}^{N} (1 - \lambda_i). \tag{3}$$

Substituting for $p_e$ in equation (2), $$\frac{\mu_i}{m} = \frac{\lambda_i}{1 - \lambda_i} p_e. \tag{4}$$

and $$\lambda_i = \frac{\frac{\mu_i}{m}}{p_e + \frac{\mu_i}{m}}. \tag{5}$$

Substituting in equation (3), it may be possible to obtain, $$p_e = \prod_{i=1}^{N} \frac{p_e}{p_e + \frac{\mu_i}{m}}. \tag{6}$$

Given the offered load $\mu_i$ and the number of channels m, the probability of success $p_s$ may be determined from equation (1) and the probability of an empty transmission slot $p_e$ may be determined from equation (6). This may leave the probability of a collision as an only other possible outcome and may be expressed as $p_b=1-p_e-p_s$.

In an actual wireless communications network, where the offered load $\mu_i$ may not be known, estimates of $p_e$ and $p_s$ may be determined and $\mu_i$ may be computed. This may require knowledge of $\lambda_i$, which may not be readily estimated. Alternatively, $\mu_i$ may be estimated from the throughput of the user i. However, this may lead to instability since during a transmission burst occurring during a period of high congestion the throughput may be low, which may lead to an incorrect conclusion that the offered load is also low.

Figure 5:
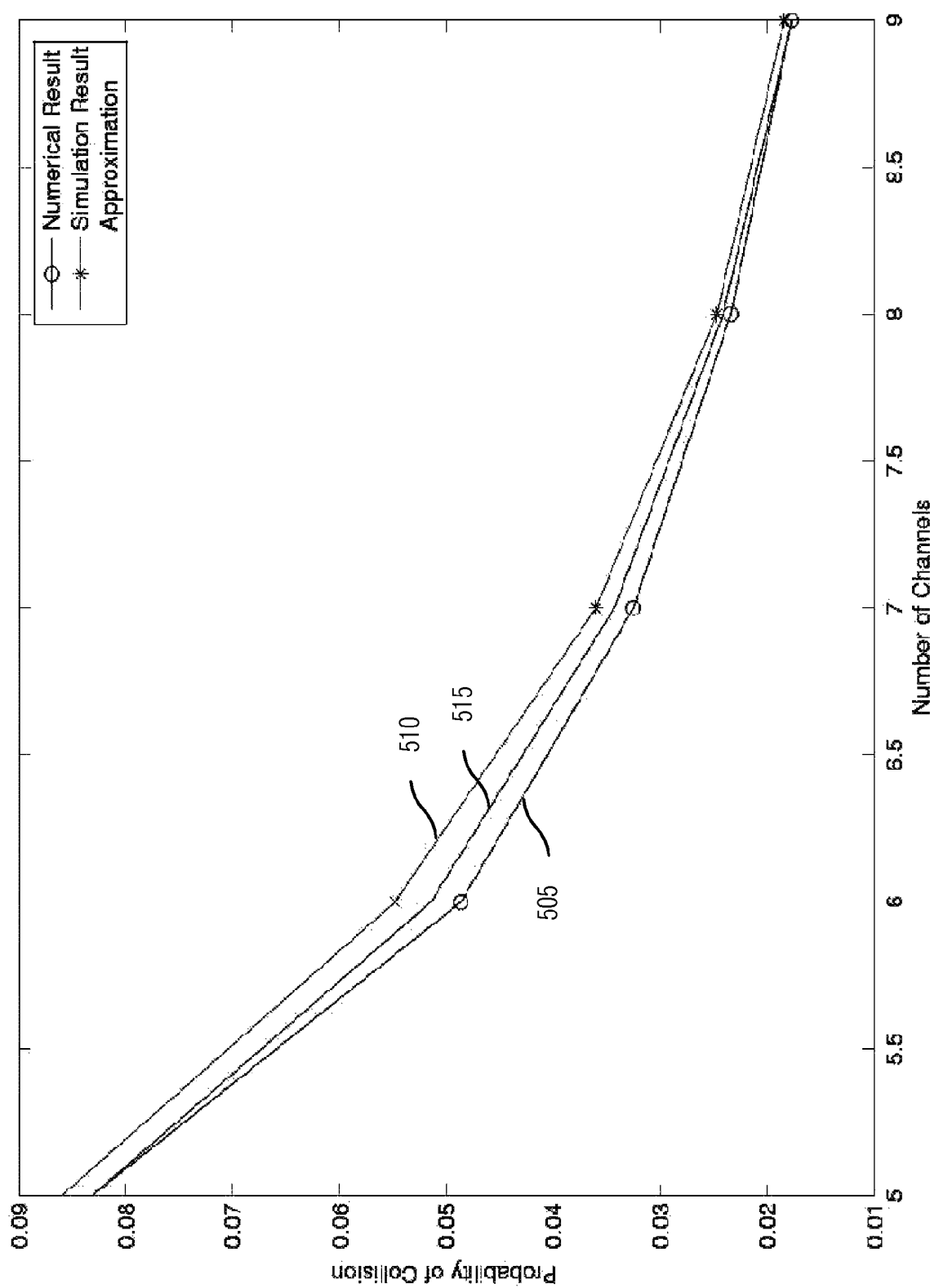
FIG. 5 is a diagram of a data plot of probability of collision versus number of channels allocated to a contention channel.

FIG. 5 illustrates a data plot of probability of collision $p_b$ versus number of channels m in a wireless communications network with 30 users. A first trace 505 illustrates values from an analytical model, a second trace 510 illustrates simulated values, and a third trace 515 illustrates a mathematical approximation of the values (analytical and/or simulated). The data plots illustrate a monotonically decreasing probability of collision as the number of channels increase. Since the probability of collision may be monotonically related to the number of channels (a controllable metric), the probability of collision may be a viable candidate as a metric indicative of the performance of the wireless communications network.

The probability that a transmission from user i is successful (denoted $q_i$) may be computed from the relationship: normalized arrival rate equal normalized attempt rate times the probability of success for a given attempt and may be expressed as:

$$q_i = \frac{\mu_i}{m\lambda_i}. \quad (7)$$

Let w be the initial back-off window size, then for binary exponential back-off, the expected delay given that a total of k transmission attempts are made before success may be expressed as:

$$w\sum_{j=1}^{k} 2^{j-2} = w(2^{k-1} - 0.5). \quad (8)$$

Therefore, the expected delay experienced by user i may be expressed as:

$$d(i) = w\sum_{k=1}^{\infty} q_i(1-q_i)^{k-1}(2^{k-1} - 0.5) = \frac{w}{2(2q_i - 1)}. \quad (9)$$

As expressed, d(i) may be finite only for values of $q_i > 0.5$. Therefore, the probability of success for a user may need to be at least 0.5 for a stable queue.

Figure 6B:
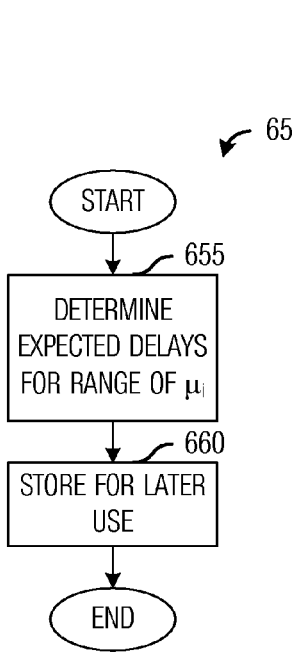
FIG. 6b is a diagram of an alternate sequence of events in the determining of an expected delay.
Figure 6A:
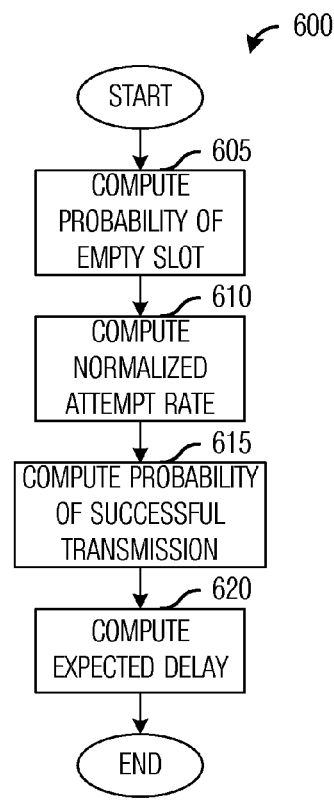
FIG. 6a is a diagram of a sequence of events in the determining of an expected delay.

FIG. 6a illustrates a sequence of events 600 in the determining of the expected delay. The sequence of events 600 may be illustrative of an implementation of the determining of the expected delay (block 405 of FIG. 4). The sequence of events 600 illustrates a technique using analytical methods. The determining of the expected delay may begin with a computing of a probability of an empty slot, $p_e$ (block 605). The probability of an empty slot may be determined using equation (6) above. The probability of an empty slot may then be used in conjunction with equation (5) to compute a normalized attempt rate, $\lambda_i$ (block 610). Following the determining of the normalized attempt rate, equations (4) and (7) may be used to compute a probability of a successful transmission, $q_i$ (block 615). Using the values computed above, the expected delay, d(i), may be computed using equation (9) (block 620).

Although the discussion focuses on the determining of the expected delay at the BS 300, it may be possible to determine the expected delay at the SS operating in the wireless communications network and then have the SS transmit the expected delay to the BS 300. Therefore, the discussion of the determining of the expected delay at the BS 300 should not be construed as being limiting to either the scope or the spirit of the embodiments.

FIG. 6b illustrates an alternate sequence of events 650 in the determining of the expected delay. In practice, it may be difficult to determine the offered load for user i ($\mu_i$). Therefore, a technique using historical data and simulation methods may be used. It may be possible to determine the expected delays using these techniques. The sequence of events 650 illustrates one such technique. The determining of the expected delay may begin with determining a probability of collision for a range of offered loads for user i (block 655). The range of offered loads may be selected a priori by studying network traffic for a wide range of applications, number of users, network loading conditions, and so forth. The expected delays may then be stored for subsequent use (block 660). The expected delays may be stored in a memory, in the form of a look-up table, for example.

For example, suppose that using network performance studies for a voice over IP (VoIP) hand-off with an offered load of L, a delay in accessing a new sector should be at most 40 milliseconds to ensure acceptable performance. Then, it may be desirable to set the corresponding expected delay for an initial ranging request to be a value less than 40 milliseconds, such as 30 or 35 milliseconds. Furthermore, based on additional studies it may be determined that if a bandwidth request may not be made in less than 20 milliseconds, then the performance may drop to less than desirable levels. Therefore, the expected delay for a bandwidth request may be set to a value less than 20 milliseconds, such as 15 milliseconds. The determining of the expected delays may be repeated for the different offered loads in the range of offered loads.

Figure 7:
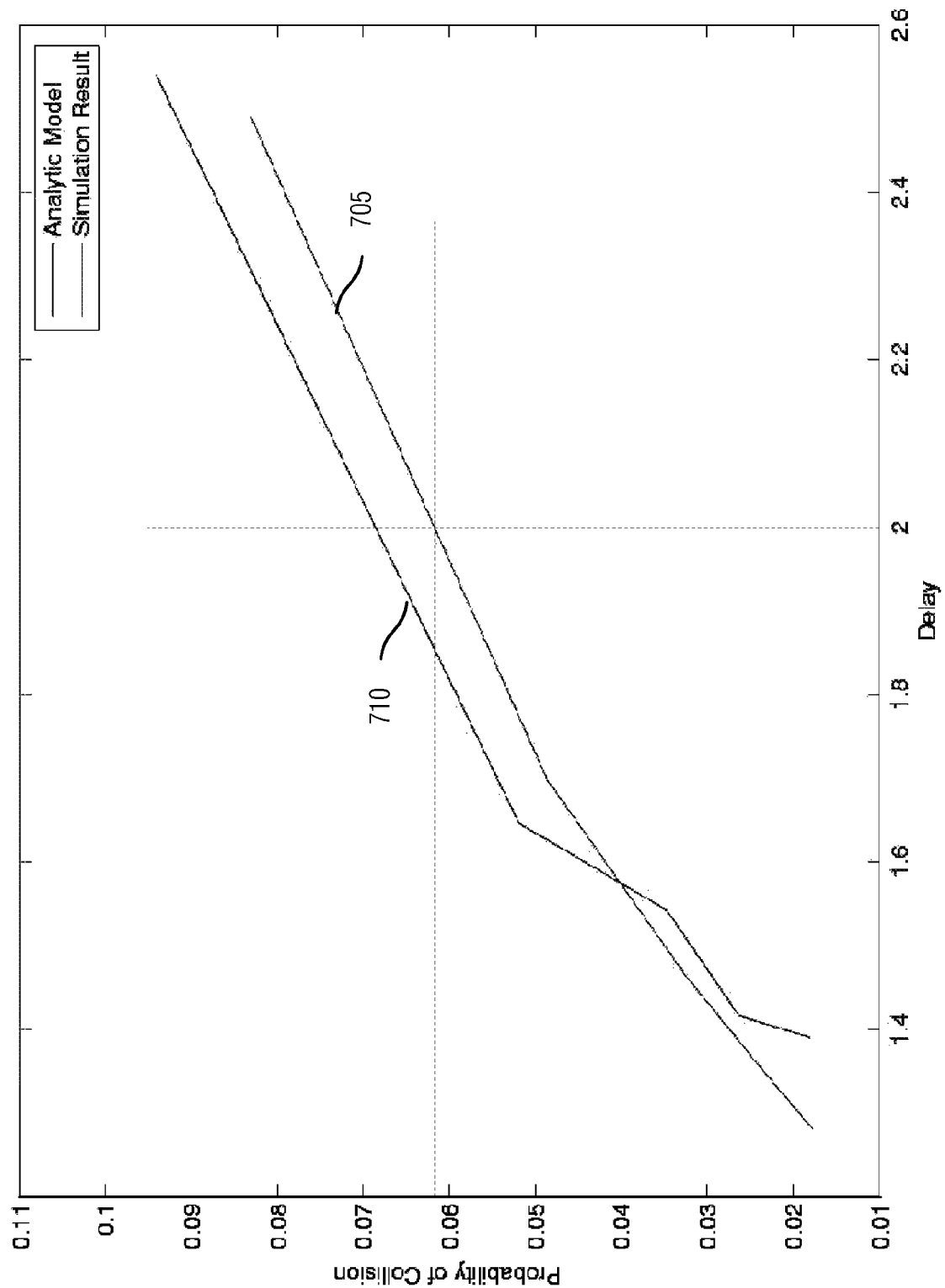
FIG. 7 is a diagram of a data plot of probability of collision versus delay.

Turning back now to FIG. 4, after computing the expected delay, the dynamic allocation of contention channel resources may continue with a determining of a target probability of collision from the expected delay (block 410). FIG. 7 illustrates a data plot of the target probability of collision versus the expected delay for a specified user, with a first trace 705 illustrating analytic model values and a second trace 710 illustrating simulated values. The data plot illustrates a monotonic relationship between the target probability of collision and the expected delay for a specified user. The monotonic relationship may allow for the selection of a target probability of collision from a given expected delay. For example, using the analytic model values (the first trace 705), a target probability of collision of about 0.061 may correspond to an expected delay of two (2) frames.

Turning back now to FIG. 4, after determining the target probability of collision, the dynamic allocation of contention channel resources may continue with a computing of an allocation of contention channel resources using the target probability of collision (block 415). After computing the allocation of contention channel resources, the resources may be allocated. The computing of the allocation of contention channel resources may make use of the probability of collisions and the number of allocated channels m, shown graphically in FIG. 5, for example. Using empirical data, it may be possible to fit an approximation to the relationship between the probability of collision and the number of allocated channels shown in FIG. 5 (the trace 515 illustrates an approximation to the simulated results (trace 510) and the numerical (analytical) results (trace 505)). The approximation may be expressed mathematically as:

$$mp_b{}^\alpha = c, \quad (10)$$

where a and c are parameters. For example, $\alpha$ is referred to as a sensitivity factor and may be obtained from simulations of transmissions made in the wireless communications network. Using the probability of collision and number of allocated channel data shown in FIG. 5, the values of α and c may be determined to be 0.38 and 1.94, respectively. Equation (10) may be rewritten as:

$$\hat{m} = m\left(\frac{p_b}{\hat{p}_b}\right)^\alpha, \quad (11)$$

where m is the current number of channels, $\hat{m}$ is the future number of channels, $p_b$ is the estimate of the current probability of collision, and $\hat{p}_b$ is the target probability of collision.

Figure 8:
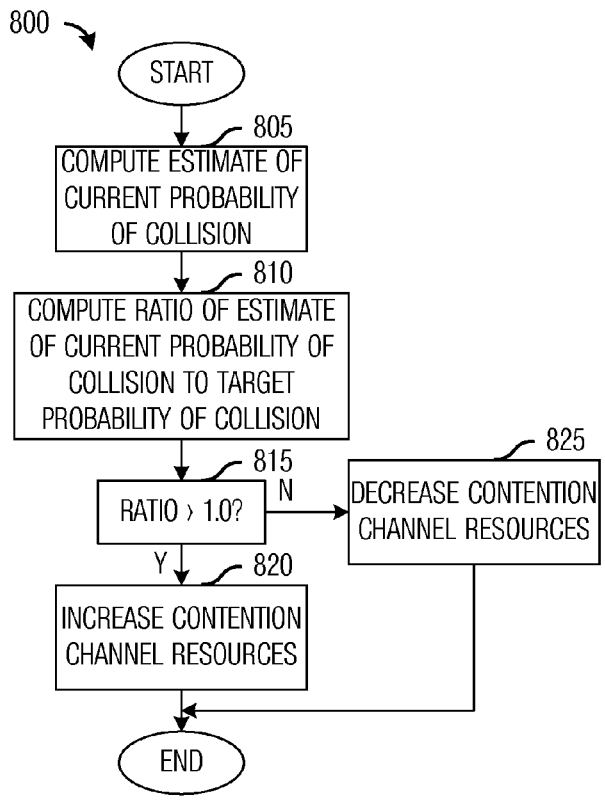
FIG. 8 is a diagram of a sequence of events in the computing of a dynamic allocation of contention channel resources.

FIG. 8 illustrates a sequence of events 800 in the computing of the dynamic allocation of contention channel resources. The sequence of events 800 may be an implementation of the computing of the allocation of contention channel resources (block 415 of FIG. 4). The computing of the dynamic allocation of contention channel resources may begin with a computing of an estimate of a current probability of collision (block 805). The estimate of the current probability of collision may be an observable metric of the wireless communications network. After computing the estimate of the current probability of collision, a ratio of the estimate of the current probability of collision to the target probability of collision (determined in block 410 of FIG. 4) may be computed (block 810).

A check may then be performed to determine if the ratio is greater than 1.0 (block 815). If the ratio is greater than 1.0, then the estimate of the current probability of collision may be larger than the target probability of collision. Therefore, additional contention channel resources may be allocated (block 820). This may result in a decrease in a subsequently determined estimate of the current probability of collision. However, if the ratio is less than 1.0, then the estimate of the current probability of collision may be smaller than the target probability of collision. Therefore, fewer contention channel resources may be allocated (block 825). This may result in an increase in a subsequently determined estimate of the current probability of collision. The sequence of events 800 may then terminate. However, since network communications patterns may change with time, the computing of the dynamic allocation of contention channel resources may be repeated periodically. Alternatively, rather than periodically computing the dynamic allocation of contention channel resources, the dynamic allocation of contention channel resources may be computed when an observable metric of the wireless communications network reaches a threshold, changes by more than a specified amount, or so on.

Alternatively, equation (11) may be directly evaluated to compute the value of $\hat{m}$. If the evaluated value of equation (11) is not an integer value, then the value may be rounded to an integer value. For example, if the evaluated value of equation (11) is equal to 5.6, then the value for $\hat{m}$ may be rounded up to 6, while if the evaluated value of equation (11) is equal to 5.4, then the value for $\hat{m}$ may be rounded down to 5.

Figure 9A:
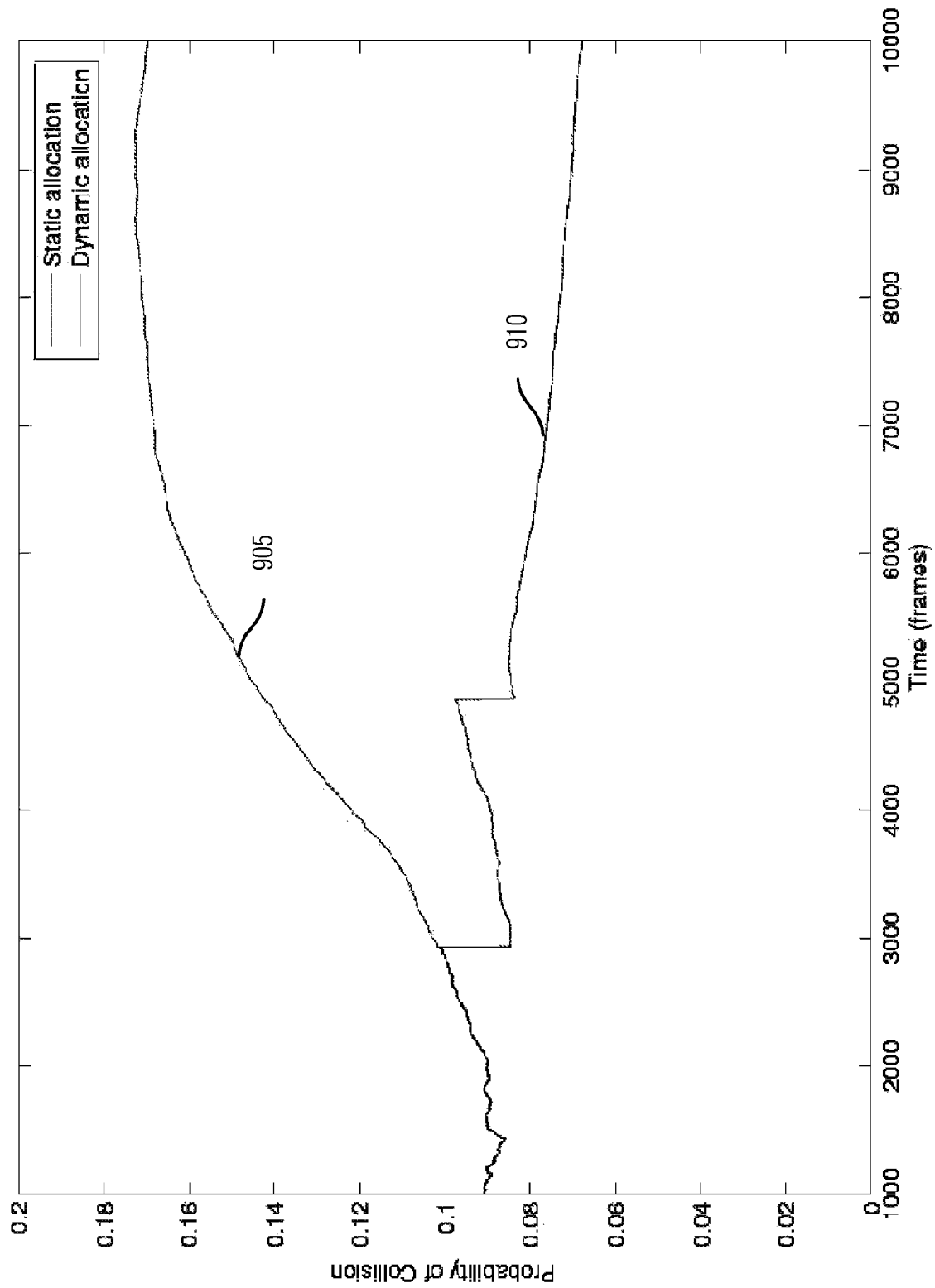
FIGS. 9a through 9c are data plots of probability of collision (FIG. 9a), channels allocated (FIG. 9b), and delay (FIG. 9c) versus time for static and dynamic allocation of contention channel resources.

FIG. 9a illustrates a data plot of the probability of collision versus time for an offered load, wherein the offered load increases by 15% at time index 2000. A first trace 905 illustrates the probability of collision versus time, wherein a static allocation of contention channel resources is used, while a second trace 910 illustrates the probability of collision versus time, wherein a dynamic allocation of contention channel resources is used with a target probability of 0.08 and a set at 0.4. The data plot shows that the dynamic allocation of contention channel resources may be able to react to the increase in offered load and reduce and stabilize the probability of collision.

Figure 9B:
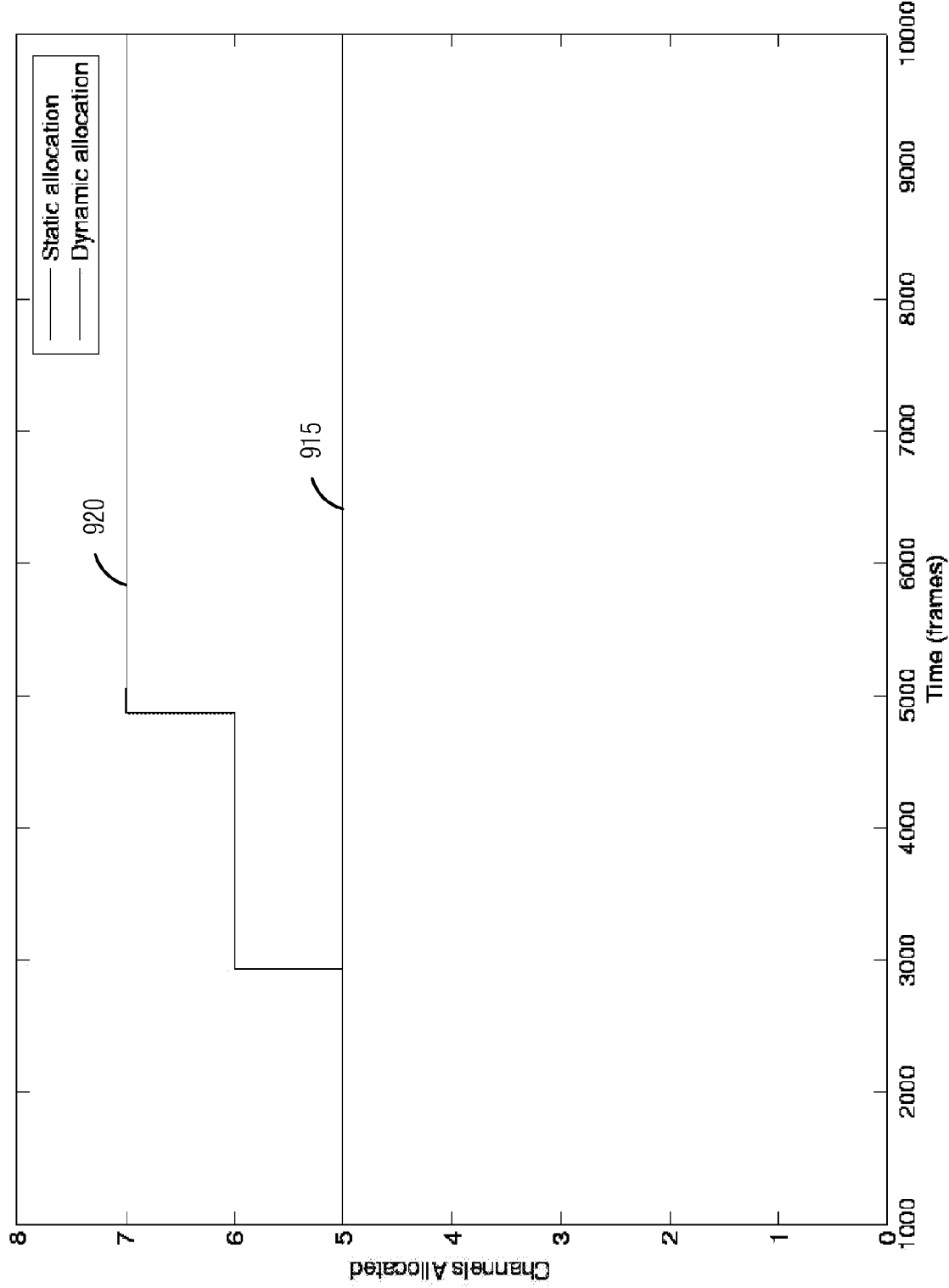

FIG. 9b illustrates a data plot of number of allocated channels versus time for an offered load, wherein the offered load increases by 15% at time index 2000. A third trace 915 illustrates the number of allocated channels versus time, wherein a static allocation of contention channel resources is used, while a fourth trace 920 illustrates the number of allocated channels versus time, wherein a dynamic allocation of contention channels is used. The fourth trace 920 shows that the number of allocated channels increases from five to six to seven to meet the changing probability of collision (referencing FIG. 9a).

Figure 9C:
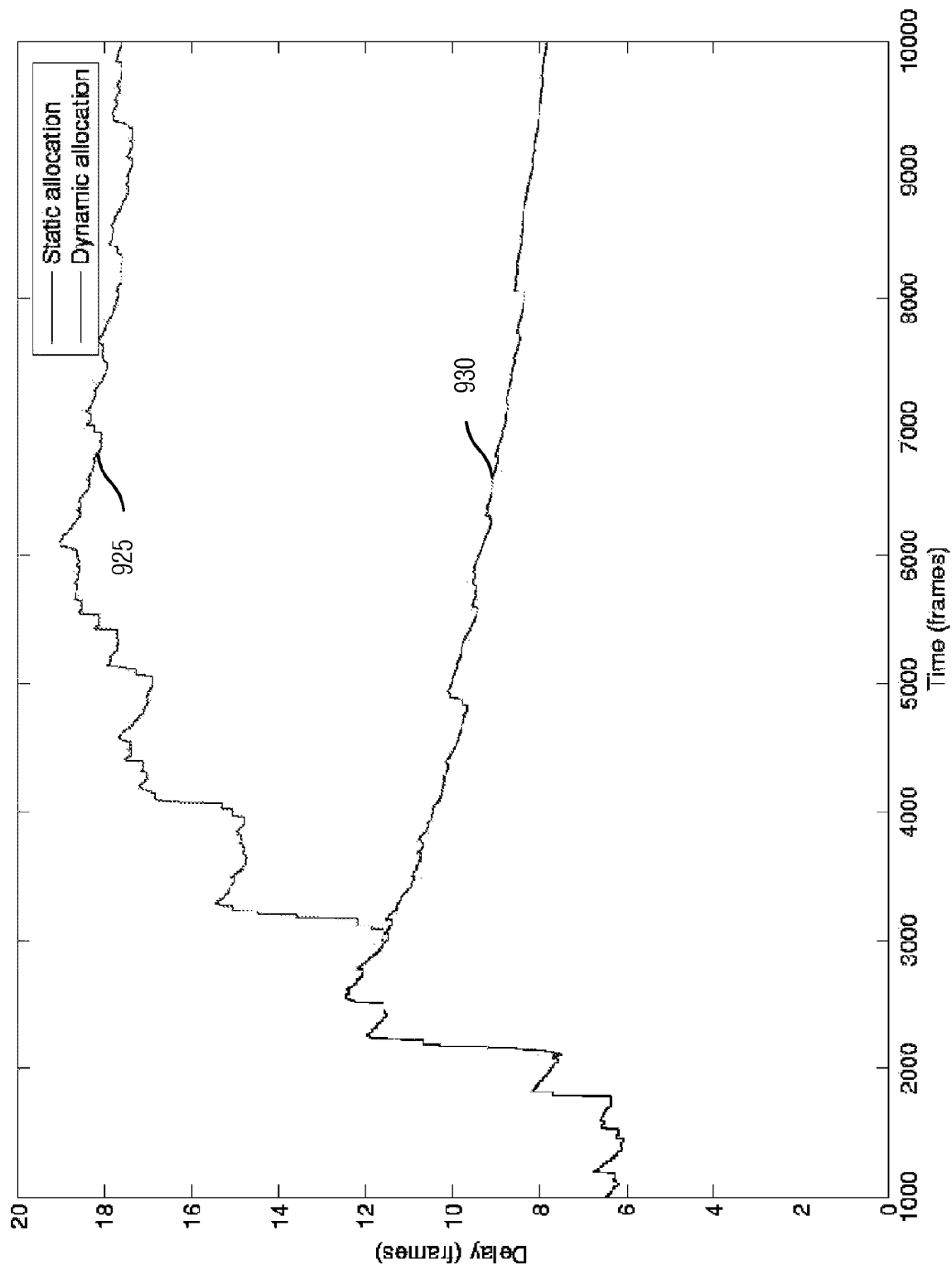

FIG. 9c illustrates a data plot of average delay versus time for an offered load, wherein the offered load increases by 15% at time index 2000. A fifth trace 925 illustrates the average delay versus time, wherein a static allocation of contention channel resources is used, while a sixth trace 930 illustrates the average delay versus time, wherein a dynamic allocation of contention channels is used. The sixth trace 930 shows that the average delay decreases as the number of allocated channels increases (referencing FIG. 9b).

Figure 10A:
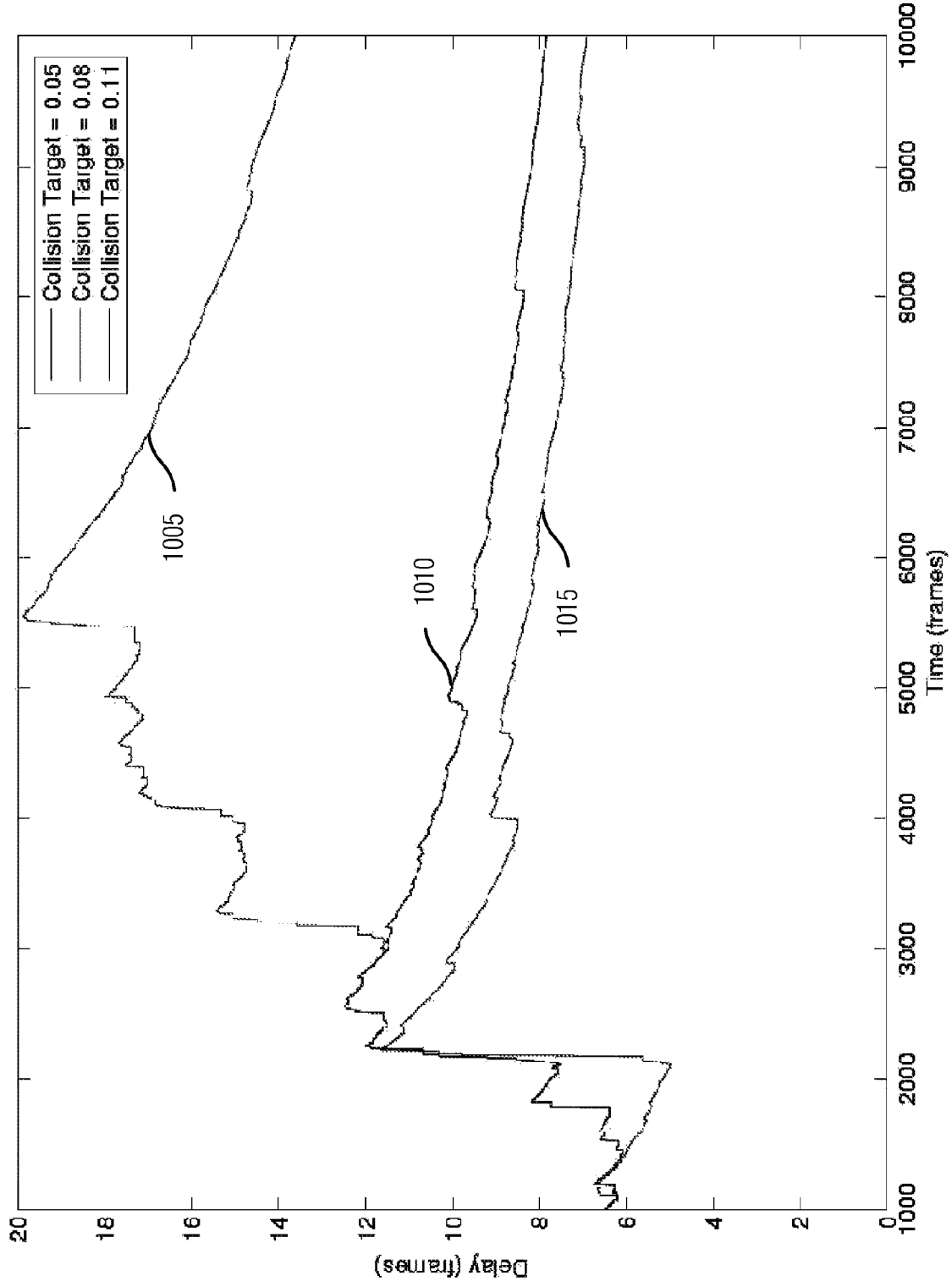
FIGS. 10a and 10b are data plots of delay (FIG. 10a) and channels allocated (FIG. 10b) versus time for several target probability of collision values.

FIG. 10a illustrates a data plot of average delay versus time for several different target probability of collision values. A first trace 1005 displays average delay versus time for a probability of collision equal to 0.11, a second trace 1010 displays average delay versus time for a probability of collision equal to 0.08, and a third trace 1015 displays average delay versus time for a probability of collision equal to 0.05. The data plot shows that the lower target probability of collision values yield a lower average delay.

Figure 10B:
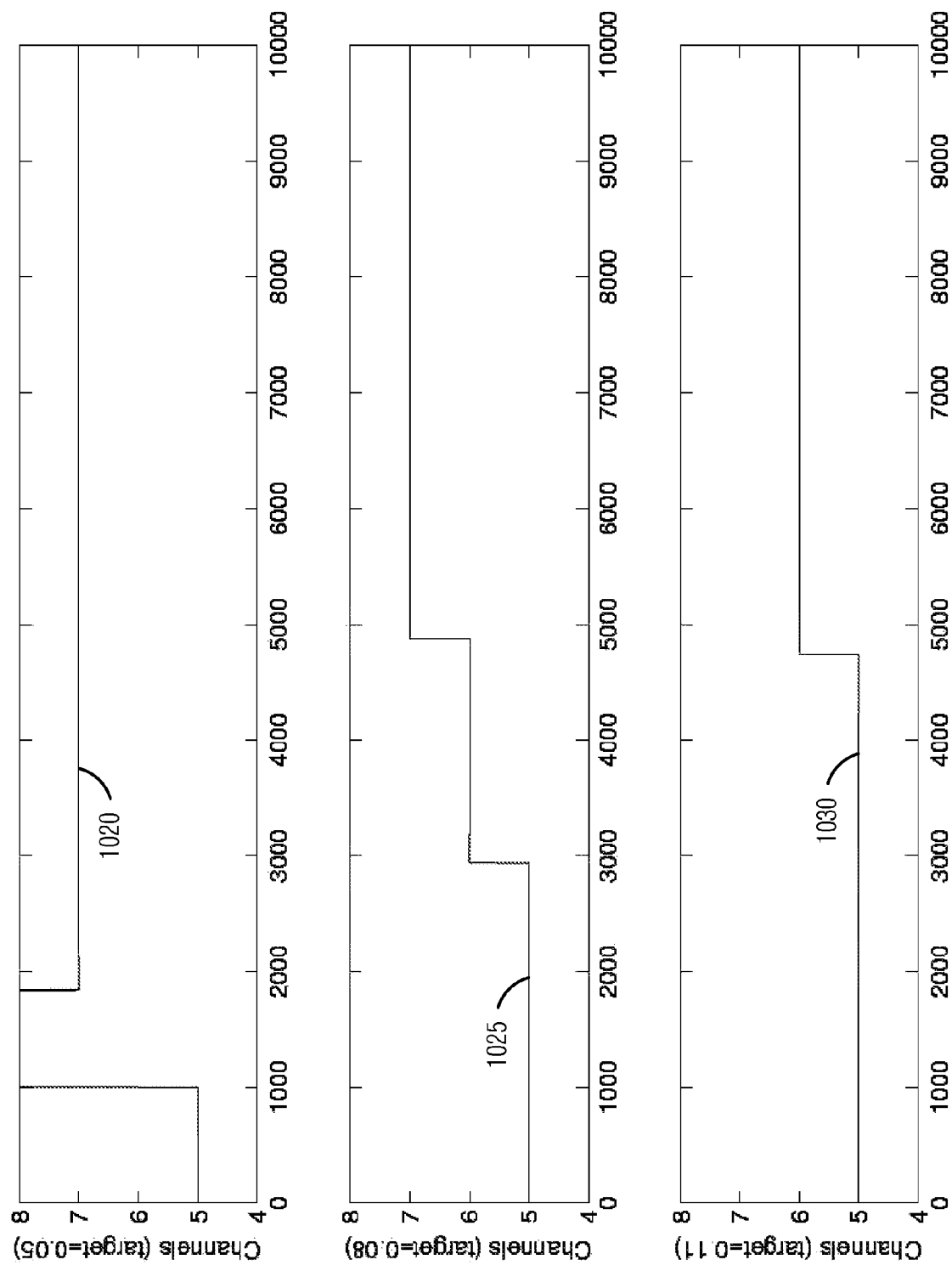

FIG. 10b illustrates data plots of number of allocated channels versus time for several different target probability of collision values. A fourth trace 1020 displays number of allocated channels versus time for a probability of collision equal to 0.05, a fifth trace 1025 displays number of allocated channels versus time for a probability of collision equal to 0.08, and a sixth trace 1030 displays number of allocated channels versus time for a probability of collision equal to 0.11. The data plot shows that lower probability of collision values may result in an allocation of a larger number of channels.

Figure 11A:
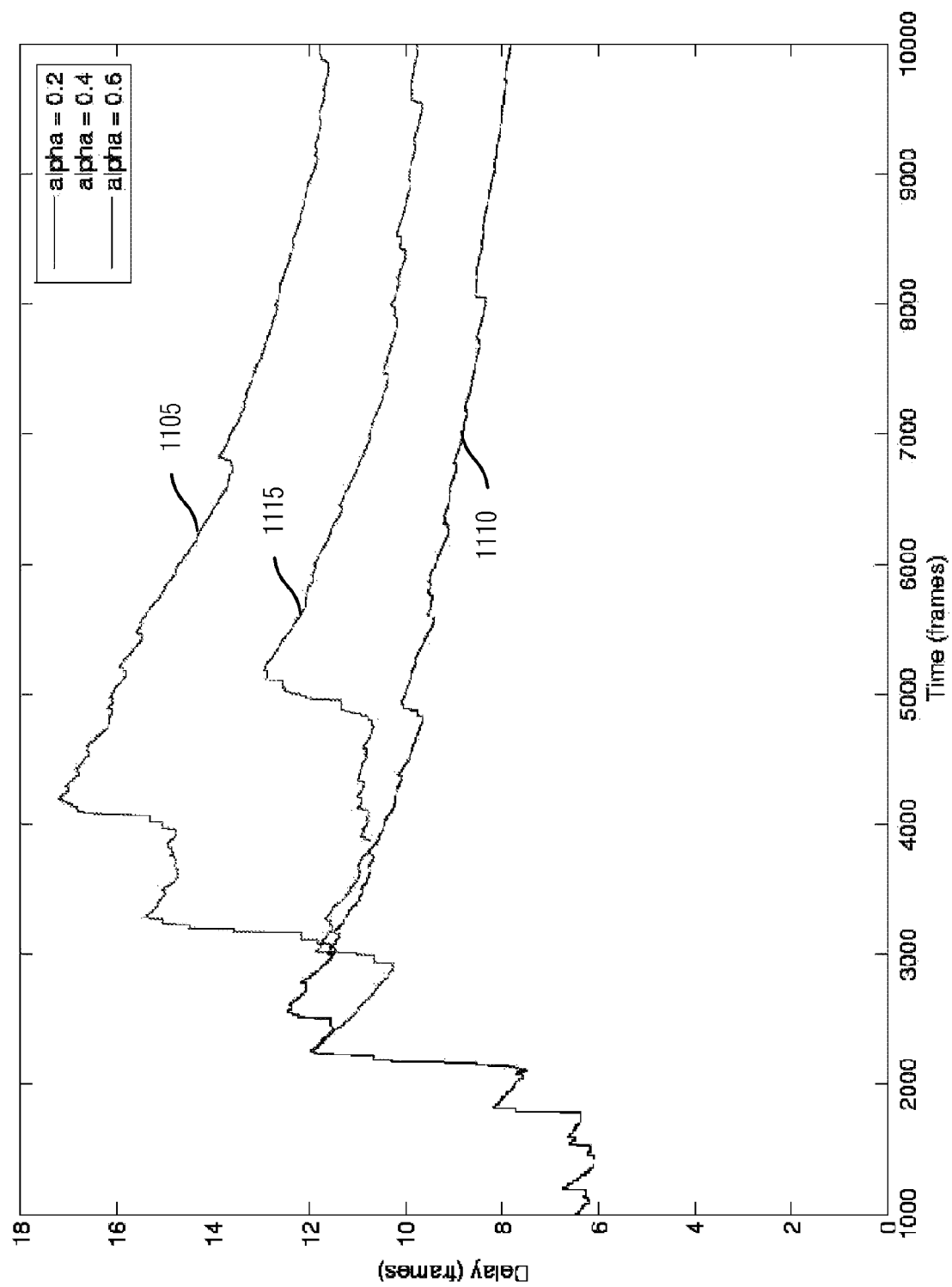
FIGS. 11a and 11b are data plots of delay (FIG. 11a) and channels allocated (FIG. 11b) versus time for several values of α.
Figure 11B:
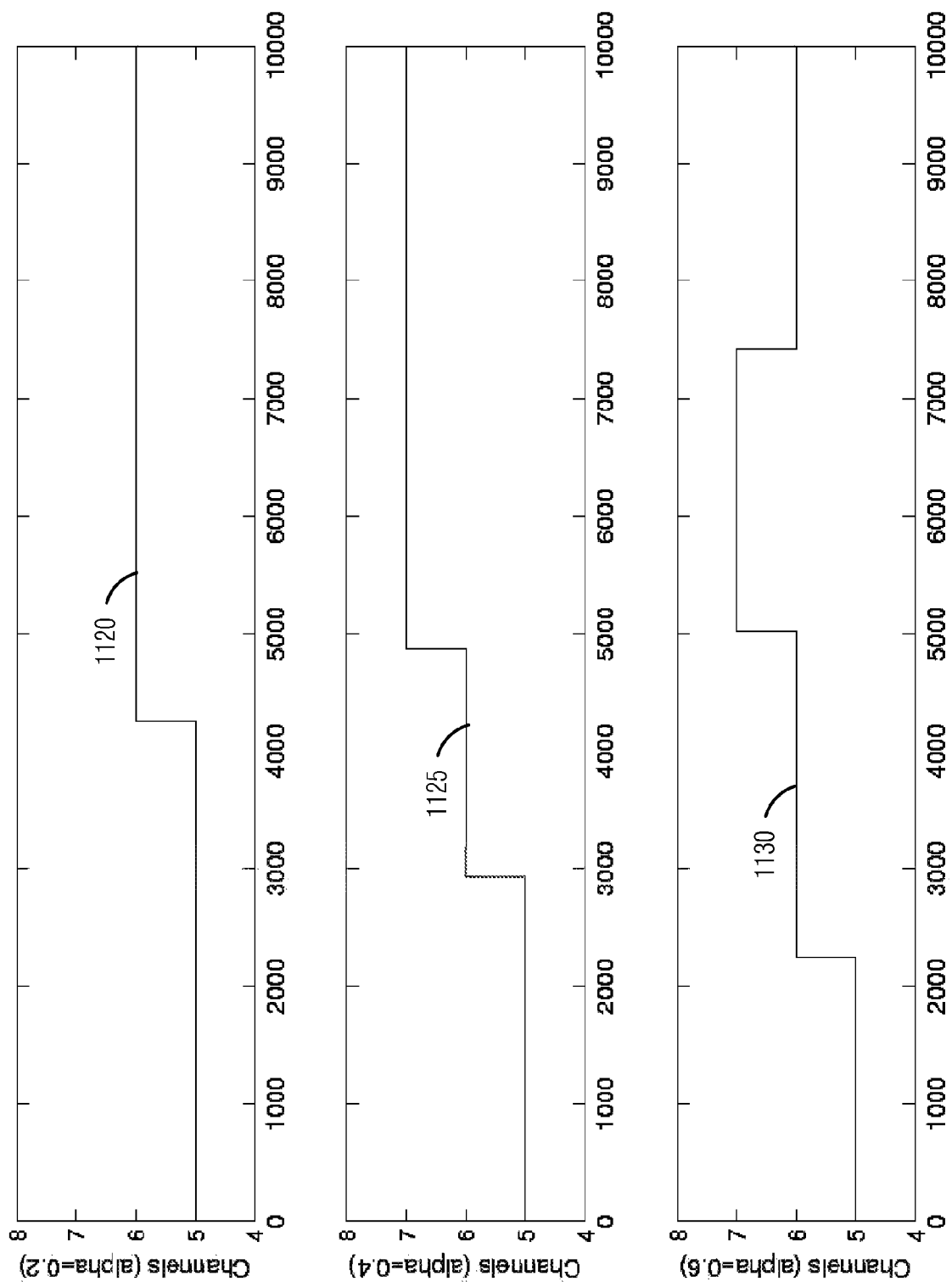

FIG. 11a illustrates a data plot of average delay versus time for several different α values. A first trace 1105 displays average delay versus time for an α value of 0.2, a second trace 1110 displays average delay versus time for an α value of 0.4, and a third trace 1115 displays average delay versus time for an α value of 0.6. FIG. 11b illustrates data plots of number of allocated channels versus time for several different α values. A fourth trace 1120 displays number of allocated channels versus time for an α value of 0.2, a fifth trace 1125 displays number of allocated channels versus time for an α value of 0.4, and a sixth trace 1130 displays number of allocated channels versus time for an α value of 0.6. The data plots show that higher α values may yield a better response time. However, this may increase the sensitivity of the dynamic allocation of contention channel resources due to changes in the offered load, which may cause undesirable oscillations that may affect steady state performance.

Figure 12:
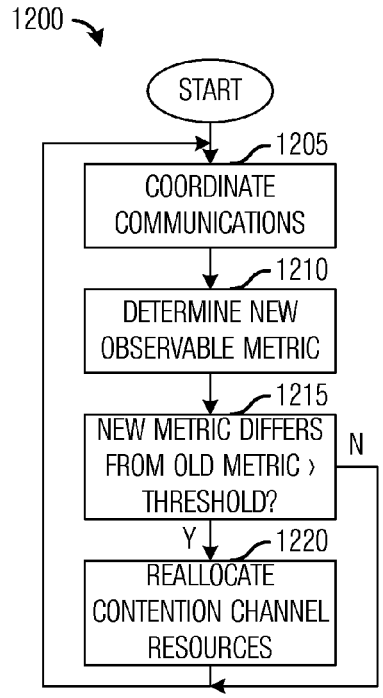
FIG. 12 is a sequence of events in operating a wireless communications network.

FIG. 12 illustrates a sequence of events 1200 in the operating of a wireless communications network. The sequence of events 1200 may be descriptive of events performed by a BS, such as the BS 300, controlling the communications in the wireless communications network. The operating of a wireless communications network includes the BS 300 coordinating communications taking place in the wireless communications network (block 1205). Coordinating communications may include receiving requests from SS in the wireless communications network over contention channels (or during contention periods) and granting/denying the requests. An SS desiring to transmit, performing ranging operations, and so forth, may transmit an appropriate request over a contention channel dedicated to the request type to the BS 300. The BS 300 may decide to grant or deny the request based on factors such as bandwidth availability, SS priority, request type, and so on.

In addition to coordinating communications (block 1205), the BS 300 may also compute observable metrics related to the performance of the wireless communications network (block 1210). Observable metrics may include probability of collision, probability of success, probability of empty transmission slot, and so forth. After computing an observable metric, the BS 300 may compare the observable metric with a previously computed version of the observable metric (block 1215). If the observable metric different from the previously computed version of the observable metric by more than a threshold (block 1215), then the BS 300 may reallocate contention channel resources (block 1220). The reallocation of the contention channel resources may be dynamic in nature, such as the dynamic allocation of contention channel resources described in FIG. 4. After reallocating the contention channel resources, the BS 300 may return to operating the wireless communications network.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for dynamically allocating resources of a contention channel in a wireless network, the method comprising:
   determining an expected delay for a ranging or bandwidth request transmission over the contention channel, the ranging or bandwidth request transmission made by a specific one of a plurality of users in the wireless network, wherein determining the expected delay comprises:
   computing a probability of an empty transmission slot in the contention channel;
   computing a normalized attempt rate, the normalized attempt rate being equivalent to the probability that the specific user made a transmission attempt in a given transmission slot;
   computing a probability of successful transmission; and
   computing the expected delay in accordance with the probability of an empty transmission slot, the normalized attempt rate, and the probability of successful transmission;
   determining a target probability of collision from the expected delay;
   computing an allocation of resources of the contention channel using the target probability of collision; and
   allocating resources of the contention channel using the computed allocation of resources.

2. The method of claim 1, wherein computing the probability of an empty transmission slot is expressible as:

$$p_e = \prod_{i=1}^{N} \frac{p_e}{p_e + \frac{\mu_i}{m}},$$

where $\mu_i$ is an offered load for user i, and m is a number of allocated channels of the contention channel.

3. The method of claim 1, wherein computing the normalized attempt rate is expressible as:

$$\lambda_i = \frac{\frac{\mu_i}{m}}{p_e + \frac{\mu_i}{m}},$$

where $\mu_i$ is an offered load for user i, and m is a number of allocated channels of the contention channel, and $p_e$ is a probability of an empty transmission slot.

4. The method of claim 1, wherein computing the probability of successful transmission is expressible as:

$$q_i = \frac{\mu_i}{m \lambda_i},$$

where $\mu_i$ is an offered load for user i, and m is a number of allocated channels of the contention channel, and $\lambda_i$ is a normalized attempt rate.

5. The method of claim 1, wherein computing the expected delay from the probability of an empty transmission slot, the normalized attempt rate, and the probability of successful transmission is expressible as:

$$d(i) = w \sum_{k=1}^{\infty} q_i (1-q_i)^{k-1} (2^{k-1} - 0.5) = \frac{w}{2(2q_i - 1)},$$

where w is an initial back-off window size, and $q_i$ is the probability of successful transmission.

6. The method of claim 1, wherein determining the expected delay comprises:
   analytically determining each expected delay for each offered load in a range of offered loads, thereby producing a range of expected delays; and
   storing the range of expected delays.

* * * * *